US012312667B2

(12) United States Patent
Nakahata et al.

(10) Patent No.: US 12,312,667 B2
(45) Date of Patent: May 27, 2025

(54) ALLOY RIBBON AND LAMINATED CORE

(71) Applicant: TDK CORPORATION, Tokyo (JP)

(72) Inventors: Isao Nakahata, Tokyo (JP); Takuya Tsukahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/211,970

(22) Filed: Mar. 25, 2021

(65) Prior Publication Data

US 2021/0301380 A1    Sep. 30, 2021

(30) Foreign Application Priority Data

Mar. 31, 2020    (JP) .................................. 2020-063266

(51) Int. Cl.
*C22C 45/02* (2006.01)
*B22D 11/00* (2006.01)
(Continued)

(52) U.S. Cl.
CPC ............ *C22C 45/02* (2013.01); *B22D 11/001* (2013.01); *B22D 11/0611* (2013.01); *B32B 3/26* (2013.01); *B32B 3/263* (2013.01); *B32B 3/30* (2013.01); *B32B 7/12* (2013.01); *B32B 15/01* (2013.01); *B32B 15/043* (2013.01); *B32B 15/08* (2013.01); *B32B 15/092* (2013.01); *B32B 15/18* (2013.01); *B32B 37/12* (2013.01); *C22C 45/04* (2013.01); *H01F 3/04* (2013.01); *B32B 2307/208* (2013.01); *B32B 2311/00* (2013.01);
(Continued)

(58) Field of Classification Search
CPC ..... C22C 2202/02; C22C 45/02; C22C 45/04;
B22D 11/001; B22D 11/0611; B32B 2311/00; B32B 3/30; B32B 3/26; B32B 3/263; B32B 7/12; B32B 15/01; B32B 15/043; B32B 15/092; B32B 15/18; B32B 15/08; B32B 37/12; B32B 2307/208; H01F 3/04; Y10T 428/1171; Y10T 428/12354; Y10T 428/12389; Y10T 428/12396; Y10T 428/12431; Y10T 428/12438; Y10T 428/12451; Y10T 428/12465; Y10T 428/12569; Y10T 428/12951; Y10T 428/12993; Y10T 428/12958
See application file for complete search history.

(56) References Cited

U.S. PATENT DOCUMENTS 6,187,217 B1    2/2001    Arai et al.
2007/0040643 A1*  2/2007    Inoue .................. H01F 41/0226
                                                     336/213
(Continued)

FOREIGN PATENT DOCUMENTS

CN    1241283 A    1/2000
CN    108405716 A    8/2018
(Continued)

OTHER PUBLICATIONS

Translation of Nov. 14, 2023 Office Action issued in Japanese Patent Application No. 2020-063266.

*Primary Examiner* — Michael E. La Villa
(74) *Attorney, Agent, or Firm* — Oliff PLC

(57) ABSTRACT

An alloy ribbon that is an alloy ribbon containing a metal as a main component, and has a recess on at least one principal surface, in which a depth of the recess is 5% or more and 75% or less of an average thickness.

7 Claims, 4 Drawing Sheets

(51) Int. Cl.
   *B22D 11/06* (2006.01)
   *B32B 3/26* (2006.01)
   *B32B 3/30* (2006.01)
   *B32B 7/12* (2006.01)
   *B32B 15/01* (2006.01)
   *B32B 15/04* (2006.01)
   *B32B 15/08* (2006.01)
   *B32B 15/092* (2006.01)
   *B32B 15/18* (2006.01)
   *B32B 37/12* (2006.01)
   *C22C 45/04* (2006.01)
   *H01F 3/04* (2006.01)

(52) U.S. Cl.
   CPC ..... *C22C 2202/02* (2013.01); *Y10T 428/1171* (2015.01); *Y10T 428/12354* (2015.01); *Y10T 428/12389* (2015.01); *Y10T 428/12396* (2015.01); *Y10T 428/12431* (2015.01); *Y10T 428/12438* (2015.01); *Y10T 428/12451* (2015.01); *Y10T 428/12465* (2015.01); *Y10T 428/12569* (2015.01); *Y10T 428/12951* (2015.01); *Y10T 428/12958* (2015.01); *Y10T 428/12993* (2015.01)

(56) References Cited

U.S. PATENT DOCUMENTS

| | | |
|---|---|---|
| 2010/0112452 A1 | 5/2010 | Nishimura et al. |
| 2012/0154084 A1 | 6/2012 | Yoshizawa et al. |
| 2016/0035474 A1* | 2/2016 | Azuma ............. B23K 26/0622 29/605 |

FOREIGN PATENT DOCUMENTS

| | | |
|---|---|---|
| JP | H08-215800 A | 8/1996 |
| JP | 2009-231263 A | 10/2009 |
| JP | 4529106 B2 | 8/2010 |
| JP | 4623400 B2 | 2/2011 |

\* cited by examiner

US 12,312,667 B2

ALLOY RIBBON AND LAMINATED CORE

BACKGROUND OF THE INVENTION

Field of the Invention

The present invention relates to an alloy ribbon and a laminated core formed using the alloy ribbon.

Priority is claimed on Japanese Patent Application No. 2020-063266, filed Mar. 31, 2020, the content of which is incorporated herein by reference.

Description of Related Art

In a structure in which functional ribbons are laminated, for example, in a laminated magnetic core, it is important to determine how densely the magnetic ribbons, which are functional layers, fill the core, in order to obtain high characteristics.

Generally, in order to improve a space factor of a laminated core, it is considered necessary to improve the surface smoothness of the ribbon and to make a layer (adhesive layer) for adhering the ribbons to each other as thin as possible. Japanese Patent No. 4529106 discloses a technique of smoothing the surface of a ribbon. In addition, Japanese Patent No. 4623400 discloses that favorable magnetic characteristics can be obtained by reducing the diameter of an air pocket formed on a roll surface of a ribbon to a certain value or less and thereby suppressing the surface roughness of the ribbon disposed on a roll.

However, the thickness of a general adhesive layer used for adhering the ribbons to each other is 10 μm or less, and a remarkable decrease in adhesive strength due to thinning of the adhesive layer occurs. As described above, it is known that there is a trade-off relationship between improvement of the space factor and adhesion between the ribbons.

SUMMARY OF THE INVENTION

The present invention has been made in view of the above circumstances, and an object of the present invention is to provide an alloy ribbon capable of enhancing an adhesion to another member through an adhesive layer while maintaining a high space factor, and a laminated core formed using the alloy ribbon.

The present invention provides the following means for solving the above problem.

(1) According to a first aspect of the present invention, an alloy ribbon containing a metal as a main component is provided, the alloy ribbon including a recess formed on at least one principal surface, in which the depth of the recess is 5% or more and 75% or less of an average thickness.

(2) In the alloy ribbon according to (1), it is preferable that the opening diameter of the recess be 10 μm or more.

(3) In the alloy ribbon according to (1) or (2), it is preferable that the recess be formed only on the one principal surface.

(4) In the alloy ribbon according to any one of (1) to (3), it is preferable that the number of recesses distributed per 1 mm² be 150 or less in plan view when seen from the thickness direction.

(5) In the alloy ribbon according to any one of (1) to (4), it is preferable that in an opening of the recess, a ratio of a major axis to a minor axis be 1.5 or more.

(6) According to a second aspect of the present invention, a laminated core is provided, including a plurality of the alloy ribbons according to any one of (1) to (5), which are laminated in the thickness direction with an adhesive layer interposed therebetween, in which at least one of two alloy ribbons facing each other through the adhesive layer has a recess on the surface facing the adhesive layer.

An alloy ribbon of the present invention has a recess on at least one principal surface that adheres to another member (alloy ribbon) through an adhesive layer. For this reason, while most of the adhesive layer is formed thin and a high space factor is maintained, high adhesion to the other member can be realized by locally increasing the thickness of the adhesive layer only where the recess is present. Therefore, a plurality of the alloy ribbons of the present invention are laminated through the adhesive layer, whereby it is possible to obtain a laminated core in which the adhesion between the laminated alloy ribbons is enhanced while maintaining a high space factor.

DETAILED DESCRIPTION OF THE INVENTION

Figure 1A:
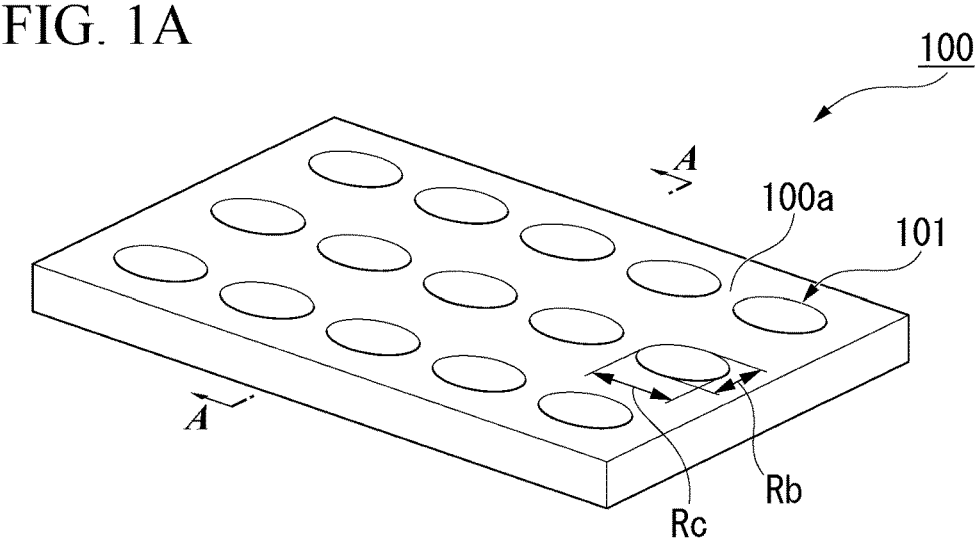
FIGS. 1(A) and 1(B) are respectively a perspective view and a cross-sectional view of an alloy ribbon according to an embodiment of the present invention.

Hereinafter, the present invention will be described in detail with reference to the drawings as appropriate. In the drawings used in the following description, in order to make the features of the present invention easy to understand, the featured portions may be enlarged, and a dimension ratio and the like of each component may be different from an actual state. The materials, dimensions, and the like exemplified in the following description are merely examples, and the present invention is not limited thereto, and can be appropriately modified and carried out within a range in which the effects of the present invention are exhibited.

Figure 1B:
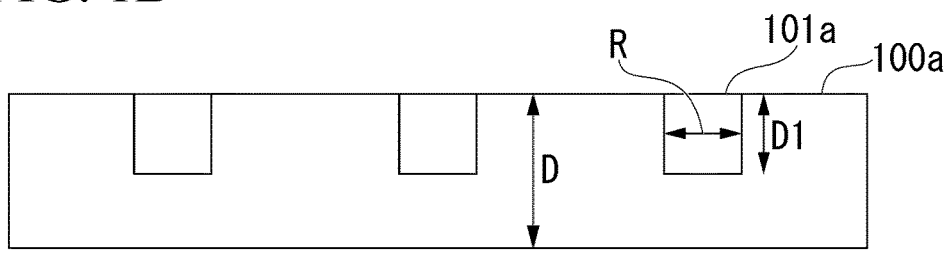

(a) of FIG. 1 is a perspective view schematically illustrating a configuration of an alloy ribbon 100 according to an embodiment of the present invention. (b) of FIG. 1 is a cross-sectional view of the alloy ribbon 100 of (a) of FIG. 1 when the alloy ribbon 100 is cut along a plane including a line A-A. The alloy ribbon 100 is a ribbon-shaped alloy thin film containing at least one of elements such as Fe, Co, Ni, Si, C, B, Nb, Mo, P, Cu, V, Al, Zn, Zr, Ag, Mn, As, Sb, Cr, Bi, Hf, Ta, O, and N, or an alloy containing the same as a main component.

The thickness of the alloy thin film is preferably about 10 to 40 km. In a case where the thickness of the alloy thin film is less than 10 m, it is difficult to maintain strength and the alloy thin film may be damaged, and when the alloy thin film is to be laminated to a predetermined thickness, the number of laminating layers increases and the number of adhesive layers increases. Therefore, it may be difficult to increase a space factor. In a case where the thickness of the alloy thin film exceeds 40 m, there is a disadvantage in that eddy current loss increases when used as a magnetic core, for example. The space factor is calculated as a proportion of the volume of a magnetic material (functional layer) to the total volume of a laminated core, and specifically, it is defined as an amount obtained by dividing a "density calculated from an external dimension and weight of the laminated core" by a "true density of the ribbon" measured by an Archimedes method or the like.

Preferred materials for forming a laminated magnetic core include, for example, an Fe-based amorphous ribbon containing Fe—Si—B as a main component, a Co-based amorphous ribbon containing Co—Fe—Ni—Si—B as a main component, and an Fe-based nanocrystalline ribbon containing Fe—Si—B—Nb—Cu, Fe—Nb—B—P, or Fe—Si—B—Nb—Cu as a main component. All the materials may further contain trace amounts of additive elements.

The alloy ribbon 100 has one or more recesses (non-penetrating holes) 101 recessed inward on at least one principal surface. In the present embodiment, a case where the recess 101 is formed only on a principal surface 100a on one side is illustrated, but the recesses 101 may be formed on principal surfaces on both sides. Note that, the position and the depth of the recesses 101 to be formed are adjusted such that the recesses 101 formed on the respective sides communicate with each other and no through-hole is formed. The shape of the formed recess 101 and the like can be detected by using a confocal laser microscope or the like.

Figure 2A:
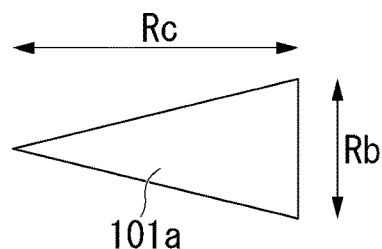
FIGS. 2(A) and 2(B) are views showing a modification example of an opening of a recess provided in the alloy ribbon of FIG. 1.
Figure 2B:
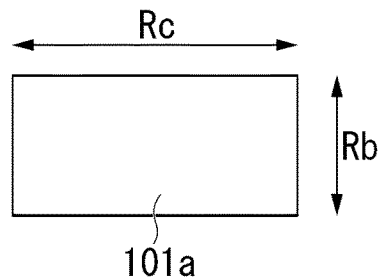

The shape of an opening 101a of the recess is not limited, but for manufacturing reasons, a substantially wedge-shaped or substantially rectangular shape as shown in (a) and (b) of FIG. 2 is easily realized, and other shapes may be formed depending on manufacturing conditions. In the opening 101a of the recess, a ratio (Rc/Rb) (aspect ratio) of a major axis (maximum diameter) Rc to a minor axis (minimum diameter) Rb is preferably 1.5 or more. A direction of the major axis Rc of each of the recesses is aligned in one direction. Since the larger the area of the opening 101a of the recess is, the more the thickness of the adhesive layer increases and the adhesion is enhanced, the opening diameter of the opening 101a, that is, an average of the maximum diameter and the minimum diameter of the opening 101a is preferably 10 µm or more.

From the viewpoint of manufacturing, an inner diameter R in the recess 101 tends to decrease in proportion to the depth, but may increase in proportion to the depth or may be constant regardless of the depth. As the recess 101 whose inner diameter changes in proportion to the depth, for example, a recess 101 having a substantially hemispherical space and a recess 101 having a conical space, a pyramidal space, or the like (substantially spindle) can be used. In addition, as the recess 101 whose inner diameter is constant regardless of the depth, a recess 101 having a cylindrical space, a prismatic space, or the like (substantially columnar) can be used, for example. The larger the sectional area (inner diameter) in the deep portion of the recess 101 (in a case of the above example, in the order of substantially spindle shape<substantially hemispherical shape<substantially columnar shape), the greater the adhesion.

A depth D1 of the recess 101 is preferably 5% or more and 75% or less of an average thickness D of the alloy ribbon 100. When the depth D1 is set to 5% or more of the average thickness D, the thickness is locally increased, and an effect of strengthening the adhesion at that portion can be obtained. Even when the depth D1 is greater than 75% of the average thickness D, the effect of increasing the adhesion can be obtained, but the influence of lowering the space factor is relatively remarkable. Here, the thickness of the alloy ribbon 100 is measured at 30 points using a micrometer, and an average value thereof is defined as the average thickness D of the alloy ribbon.

In plan view seen from a thickness D direction of the alloy ribbon 100, the number (number density) of the recesses 101 distributed per 1 mm$^2$ is preferably 1 or more and 150 or less. Even when the number density of the recesses 101 exceeds 150, the effect of increasing the adhesion can be obtained, but the influence of lowering the space factor is relatively remarkable. In a case where the number density of the recesses 101 exceeds 150, a distance between the recesses 101 becomes short, the surface of the ribbon is lost between the recesses, and the space factor may be lowered. The distribution method of the recesses 101 in the same plan view is not particularly limited, and it is preferable that the recesses 101 be uniformly distributed. However, depending on the application, the recesses 101 may be densely distributed in the center, distributed along an outer periphery, or randomly distributed.

Figure 3:
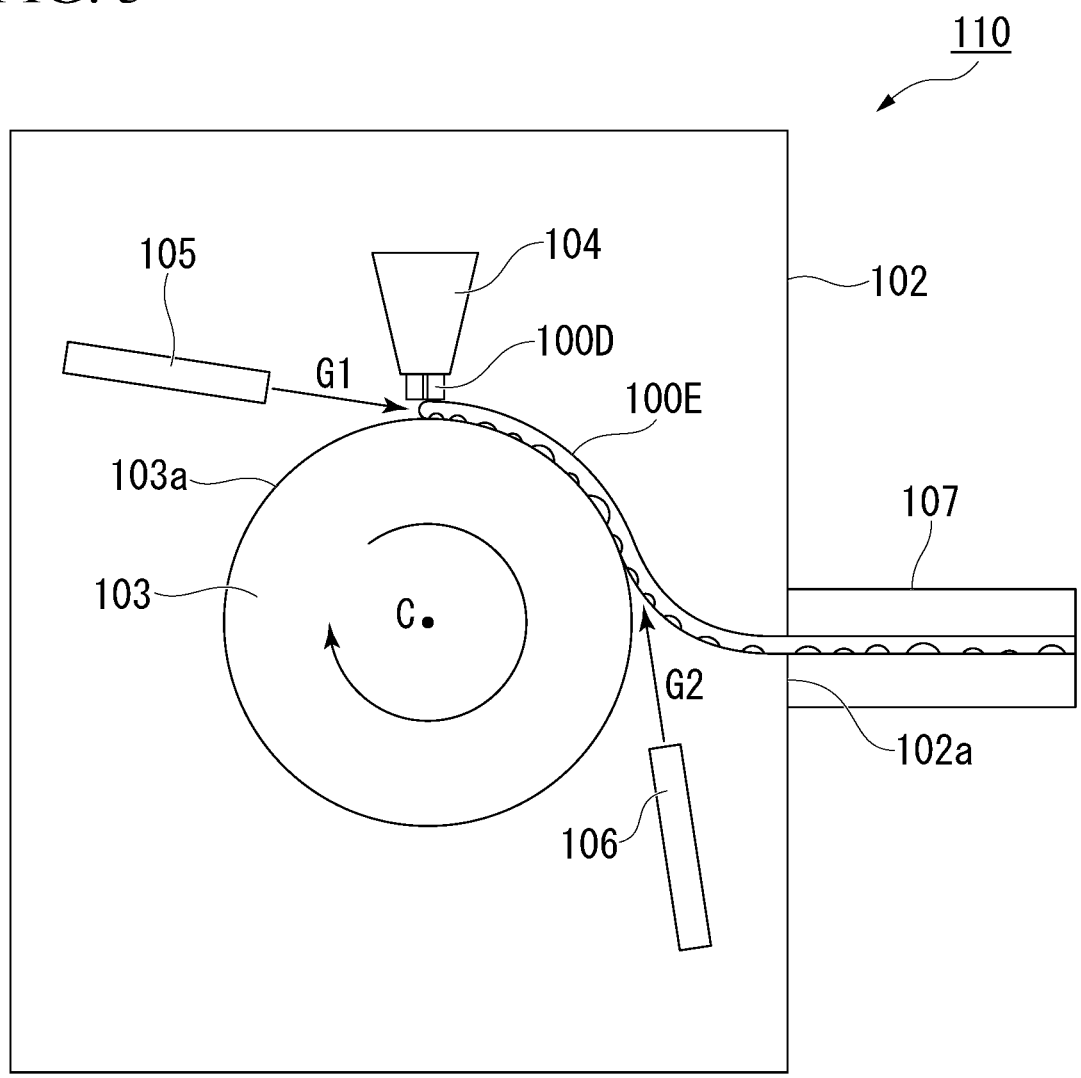
FIG. 3 is a schematic configuration diagram of a manufacturing apparatus of manufacturing the alloy ribbon of FIG. 1.

FIG. 3 is a diagram showing an example of a manufacturing apparatus 110 of the alloy ribbon. The manufacturing apparatus 110 mainly includes a chamber 102, a roller 103 disposed in the chamber 102, three nozzles 104, 105, and 106, and a tube 107 connected to an opening 102a on a side wall of the chamber 102.

The roller 103 functions as means for rotating in one direction (here, a clockwise direction) with an axis passing through the center C as a rotation axis.

The nozzle 104 is connected to a raw material supply source (not shown) of the alloy ribbon, and functions as means for supplying (dropping) a raw material (molten metal) 100D of the alloy ribbon dissolved in a liquid state to a surface 103a of the rotating roller 103.

The nozzle 105 is connected to a supply source (not shown) of a gas G1, and functions as means for supplying (injecting) the gas G1 between the raw material 100D of the alloy ribbon supplied from the nozzle 104 and the surface 103a of the roller.

As the gas G1, a gas, such as air, argon, nitrogen, or carbon dioxide, is used. The injected gas G1 is dissolved and thermally expanded by coming into contact with the raw material 100D at a high temperature. The raw material 100D rotates together with the roller 103 with the thermally expanded gas G1 interposed between the raw material 100D and the surface 103a of the roller. The raw material 100D is solidified in the process of rotation, and forms the alloy ribbon 100 in a state of being in close contact with the surface 103a of the roller.

The nozzle 106 is connected to a supply source (not shown) of a gas G2, and functions as means for supplying (injecting) the gas G2 toward a gap between the alloy ribbon 100 and the surface 103a of the roller such that the solidified alloy ribbon 100 is separated from the surface 103a of the roller. As the gas G2, a gas, such as air, argon, nitrogen, or carbon dioxide, is used.

The separated alloy ribbon 100 is taken out of the chamber 102 from the opening 102a via the inside of the tube 107. The removed alloy ribbon 100 is wound around a predetermined roll and stored. On the surface of an alloy ribbon 100E separated from the roller 103, a space in which the gas G1 is pushed remains as the recess 101.

An uneven structure may be formed on the surface 103a of the roller by roughening the surface 103a by, for example, polishing with abrasive paper or sandblasting. In this case, the gas G1 is likely to accumulate at the position of the uneven structure, and the recess is likely to be formed on the surface of an alloy ribbon 100B.

For example, the manufacturing conditions, such as a pressure in the chamber 102 and a rotation speed of the roller 103, are adjusted, whereby the recesses 101 having a desired shape and size and being distributed at a desired ratio can be formed. The higher the pressure in the chamber 102, the larger the opening diameter and the greater the depth of the recess 101. In addition, the larger the number of rotations of the roller 103, the larger the aspect ratio of the opening 101a when viewed from a direction orthogonal to the surface of the alloy ribbon 100B. In the present embodiment, various manufacturing conditions are adjusted such that at least the depth of the recess is 5% or more and 75% or less of the average thickness D, preferably, and the opening diameter of the recess 101 is 10 μm or more, and more preferably, the number of recesses 101 distributed per 1 mm$^2$ is 150 or less.

Figure 4A:
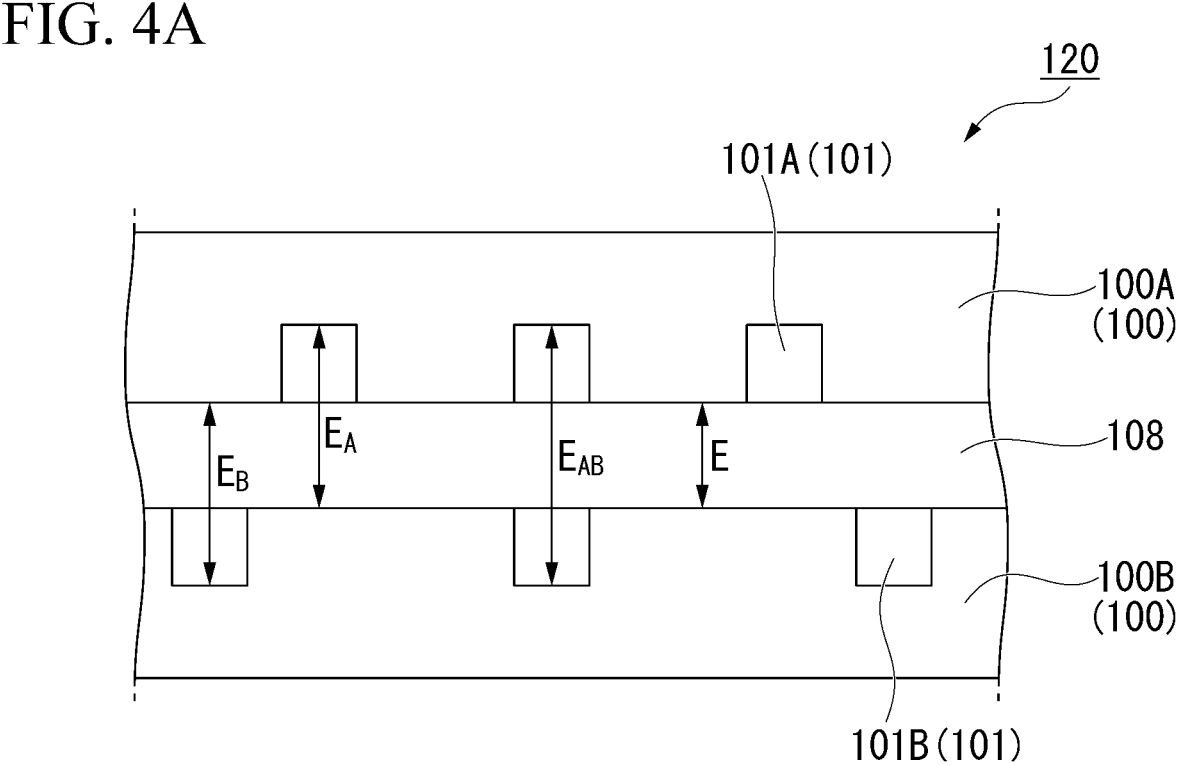
FIGS. 4(A) and 4(B) are cross-sectional view of a laminated core formed using the alloy ribbon of FIG. 1.
Figure 4B:
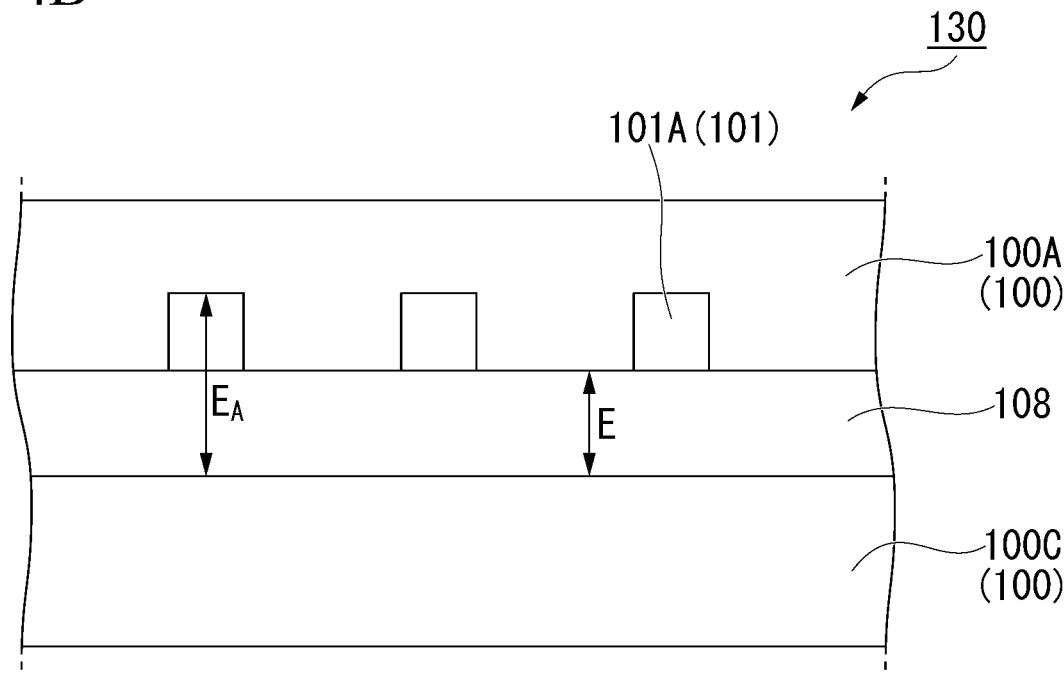

(a) of FIG. 4 is a cross-sectional view of a laminated core 120 obtained by stacking a plurality of the alloy ribbons 100 of the present embodiment with an adhesive layer 108 interposed therebetween. As the adhesive layer 108, a known adhesive layer can be used, and for example, a material, such as an acrylic adhesive, a silicone resin, a butadiene resin, or an epoxy resin, is used. An average thickness of the adhesive layer 108 is preferably about 0.5 to 10 μm.

At least one of two alloy ribbons 100A and 100B facing each other through the adhesive layer 108 has the recess 101 on the surface facing the adhesive layer 108. With this, even when the average thickness of the adhesive layer 108 is reduced as a whole, the thickness of the adhesive layer 108 where the recess 101 is present is locally increased. Therefore, a predetermined adhesion can be maintained. In order to maintain the adhesion uniformly over the entire alloy ribbon 100, the recesses 101 are preferably formed isotropically in plan view seen from the thickness D direction.

Here, a case is illustrated where both alloy ribbons 100A and 100B have recesses 101A and 101B on the adhesive layer 108 side, respectively. In addition, although a case where the recesses 101A and 101B are distributed at different pitches is illustrated here, the recesses 101A and 101B may be distributed at the same pitch.

In plan view seen from the thickness D direction, the recesses 101A and 101B may not overlap each other, but when the recesses 101A and 101B overlap each other, a thickness $E_{AB}$ of the adhesive layer 108 at that portion increases more than thicknesses $E_A$ and $E_B$ of the adhesive layer 108 when the recesses 101 are present only on one side, and the adhesion also increases in proportion thereto.

Here, although a case where two alloy ribbons 100A and 100B are laminated is illustrated, the number of laminating layers is not limited, and three or more may be laminated.

(b) of FIG. 4 is a cross-sectional view of a laminated core 130 according to a modification example of the present embodiment. In a case where at least one alloy ribbon has the recess 101 on the adhesive layer 108 side, a portion having the thickness $E_A$ exceeding the average thickness E is locally formed with respect to one adhesive layer 108. Therefore, an effect of maintaining the adhesion is obtained. For this reason, as shown in FIG. 4, when one alloy ribbon 100A has the recess 101A on the adhesive layer 108 side, the other alloy ribbon 100C may not have a recess.

As described above, the alloy ribbon 100 of the present invention has the recess 101 on at least one principal surface 100a that adheres to another member (alloy ribbon) through the adhesive layer 108. For this reason, while most of the adhesive layer 108 is formed thin and a high space factor is maintained, high adhesion to the other member can be realized by locally increasing the thickness of the adhesive layer only where the recess 101 is present. Therefore, a plurality of the alloy ribbons 100 of the present embodiment are laminated through the adhesive layer 108, whereby it is possible to obtain the laminated core 120 in which the adhesion between the laminated alloy ribbons 100 is enhanced while maintaining a high space factor. In addition, in the alloy ribbon 100 of the present embodiment, compared with a case where the surface of the alloy ribbon 100 in contact with the adhesive layer 108 is flat, the recess 101 exhibits an effect such as friction for suppressing the displacement of the adhesive layer 108 in an in-plane direction, whereby the adhesion can be further enhanced.

When the adhesive layer 108 is thin, the adhesion increases as the thickness of an adhesive increases. Therefore, the deeper the depth of the recess 101, the greater the adhesion. In terms of an average adhesion, it is considered that the adhesion is higher when the number of deep parts is large than when there are a small number of deep parts. When the opening diameter is the same and the number is the same, it is considered that the adhesion increases when the average depth is deeper.

EXAMPLES

Hereinafter, the effects of the present invention will be made more apparent by way of Examples. The present invention is not limited to the following examples, and can be appropriately modified and implemented without changing the gist thereof.

An alloy ribbon having no recess on the surface (Comparative Example) and an alloy ribbon having a recess on the surface (Examples 1 to 10) were prepared, and the adhesion and space factor thereof were measured. In the alloy ribbons of Examples 1 to 10, the opening diameter (average diameter of the maximum diameter and the minimum diameter) of the recess was 10 μm or more, the depth of the recess was 5% to 75% of an average thickness (here, about 20 m), and the number of recesses per 1 mm$^2$ was different from each other.

An adhesive layer was formed on the surface of the alloy ribbons of Comparative Example and Examples 1 to 10 (side with the recess in Examples 1 to 10), another alloy ribbon was bonded thereto through the adhesive layer, and the force required to peel off the bonded ribbon was regarded as adhesion. The adhesion required to peel off the adhesive layer was measured, and a case where the adhesion was 0.01 N/mm was evaluated as A, a case where the adhesion was 0.02 N/mm was evaluated as B, a case where the adhesion was 0.03 N/mm was evaluated as C, and a case where peeling-off was not performed by the adhesion of 0.04 N/mm or more was evaluated as D. A ratio of a dimensional density of a laminated product and a laminate to a theoretical density of the alloy ribbon was calculated as the space factor. Table 1 summarizes a relationship among the number of recesses per 1 mm$^2$, the adhesion, and the space factor for the alloy ribbons of Comparative Example and Examples 1 to 10. In addition, Table 2 summarizes a relationship among the number of recesses per 1 mm$^2$, the proportion (%) of recesses having an aspect ratio of 1.5 or more, the adhesion, and the space factor for the alloy ribbons of Examples 11 to 14.

TABLE 1

| | Number of recesses (mm$^{-2}$) having opening diameter of 10 μm or more and depth of 5% to 75% of average thickness | Adhesion | Space factor (%) |
|---|---|---|---|
| Comparative Example | 0 | A | 88.0 |
| Example 1 | 1 | B | 87.8 |
| Example 2 | 2 | B | 87.8 |
| Example 3 | 7 | B | 87.7 |
| Example 4 | 10 | C | 87.6 |
| Example 5 | 20 | C | 87.5 |
| Example 6 | 50 | C | 87.2 |
| Example 7 | 75 | C | 86.7 |
| Example 8 | 100 | C | 86.0 |
| Example 9 | 150 | C | 85.0 |
| Example 10 | 200 | C | 80.0 |

As shown as Comparative Example, it can be seen that when there is no recess, a high space factor is obtained, but the adhesion is weak. On the other hand, in Example 1, it can be seen that the adhesion is doubled only by increasing the number of recesses per 1 mm$^2$ by one.

TABLE 2

| | Number of recesses (mm$^{-2}$) having opening diameter of 10 μm or more and depth of 5% to 75% of average thickness | Proportion (%) of recesses having opening aspect ratio of 1.5 or more | Adhesion | Space factor (%) |
|---|---|---|---|---|
| Example 11 | 50 | 2 | D | 87.5 |
| Example 12 | 48 | 50 | D | 87.4 |
| Example 13 | 55 | 80 | D | 87.2 |
| Example 14 | 50 | 98 | D | 87.0 |

From Example 11, it can be seen that in a case where even a small number of recesses having an aspect ratio of 1.5 or more are provided, both high adhesion and high space factor can be realized. On the contrary, from Examples 13 and 14, it can be seen that even when the aspect ratio of most of the provided recesses is 1.5 or more, both high adhesion and high space factor can be realized similarly.

Figure 5:
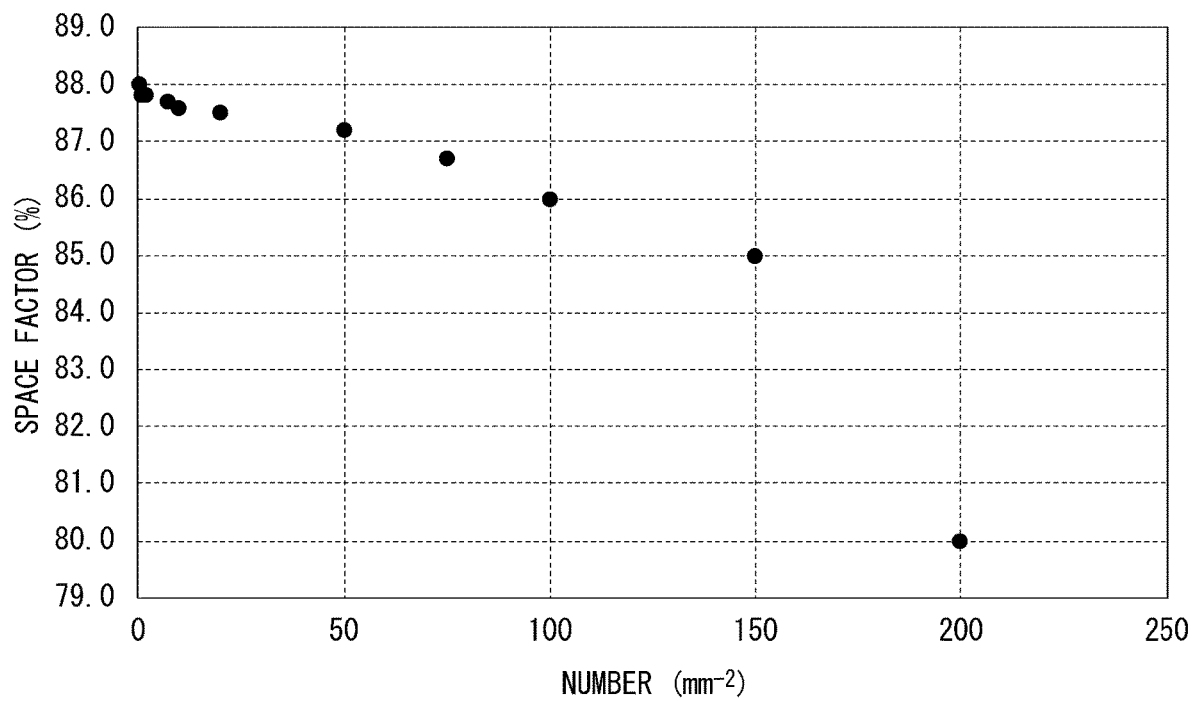
FIG. 5 is a graph on which pieces of data on a number density of recesses and a space factor in Comparative Example and Examples of the present invention are plotted.

FIG. 5 is a graph on which pieces of data on the number of recesses and the space factor in Comparative Example and Examples 1 to 10 shown in Table 1 are plotted. A horizontal axis of the graph shows the number of recesses (mm$^{-2}$) having the opening diameter of 10 μm or more and the depth of 5% to 75% of the average thickness of the alloy ribbon. A vertical axis of the graph shows the space factor of the alloy ribbon. With regard to the space factor, it can be seen that there is no substantial difference between a case where the number of recesses per 1 mm$^2$ is 0 and a case where the number of recesses per 1 mm$^2$ is 1, and that there is a significant difference between a case where the number of recesses per 1 mm$^2$ is larger than 150 and a case where the number of recesses per 1 mm$^2$ is smaller than 150. From these results, it can be seen that in a range in which the number of recesses per 1 mm$^2$ is 150, the adhesion can be increased by 3 times or more as compared with the conventional flat alloy ribbon having no recesses while maintaining the space factor of the alloy ribbon at a high value of 85% or more.

EXPLANATION OF REFERENCES

100, 100A, 100B, 100E: alloy ribbon
100a: one principal surface of alloy ribbon
101: recess
101a: opening of recess
100D: raw material of alloy ribbon
102: chamber
102a: opening of chamber
103: roller
103a: surface of roller
104, 105, 106: nozzle
107: tube
108: adhesive layer
110: manufacturing apparatus of alloy ribbon
120, 130: laminated core
D: average thickness of alloy ribbon
D1: depth of recess
E: average thickness of adhesive layer
$E_A$, $E_B$, $E_{AB}$: thickness of adhesive layer
G1, G2: gas
R: inner diameter of recess
Rb: minor axis of recess
Rc: major axis of recess

What is claimed is:

1. An alloy ribbon containing a metal as a main component and having two flat principal surfaces, comprising:
    a plurality of recesses formed on at least one principal surface of the two flat principal surfaces,
    wherein a depth of each of the recesses in the plurality of recesses is 5% or more and 75% or less of an average thickness averaged in a region where no recesses are formed,
    in an opening of each of the recesses in the plurality of recesses, a ratio of a major axis to a minor axis is more than 1.5,
    a direction of the major axis of each of the recesses in the plurality of recesses is aligned in one direction, and
    a shape of each opening of the recesses in the plurality of recesses is a wedge-shape or a rectangular shape.

2. The alloy ribbon according to claim 1,
    wherein an opening diameter of each of the recesses in the plurality of recesses is 10 μm or more, the opening diameter being an average diameter of a maximum diameter and a minimum diameter of an opening.

3. The alloy ribbon according to claim 1,
    wherein each of the recesses in the plurality of recesses is formed only on the one principal surface, and
    no recess is formed on the other principal surface.

4. The alloy ribbon according to claim 1,
    wherein a number of the recesses in the plurality of recesses distributed per 1 mm$^2$ on each of the principal surface is 150 or less in plan view seen from the thickness direction.

5. The alloy ribbon according to claim 1, containing at least one element selected from the group consisting of Fe, Co, Ni, Si, C, B, Nb, Mo, P, Cu, V, Al, Zn, Zr, Ag, Mn, As, Sb, Cr, Bi, Hf, Ta, O, and N.

6. The alloy ribbon according to claim 1,
    wherein a thickness of the alloy ribbon is 10 μm or more and 40 μm or less.

7. A laminated core, comprising:
    a plurality of the alloy ribbons according to claim 1, which are laminated in the thickness direction with an adhesive layer interposed therebetween,
    wherein at least one of two alloy ribbons facing each other through the adhesive layer has a recess on the surface facing the adhesive layer.

\* \* \* \* \*